United States Patent

[11] 3,581,846

[72] Inventor Julian A. Janus
     926 Brooklyn Ave., Brooklyn, N.Y. 11203
[21] Appl. No. 851,533
[22] Filed Aug. 20, 1969
[45] Patented June 1, 1971

[54] SAFETY LOCKING BLOCK DEVICE FOR WHEELED VEHICLES
4 Claims, 7 Drawing Figs.

[52] U.S. Cl. .................................................. 188/32,
                              105/368, 248/119, 248/361
[51] Int. Cl. .................................................. B60f 3/00
[50] Field of Search............................................ 188/32;
           105/368, 368 B, 368 T, 369 C; 248/119, 361

[56] References Cited
UNITED STATES PATENTS
2,055,829  9/1936  Tobin ........................... 105/368R
2,773,564  12/1956  Garard; Sr. ................... 188/32

FOREIGN PATENTS
675,784  11/1929  France ......................... 188/32

Primary Examiner—George E. A. Halvosa
Attorney—Bruns & Jenney

ABSTRACT: A pair of blocks shaped as chocks to fit under the forward and rearward portions of a vehicle wheel are joined together by a tie bar having one end secured to one block and having its other end slidingly received in ears projecting from a locking plate secured to the other block. A locking pin bearing a cam can be turned to force the cam against the bar. The pin handle is in the form of a loop and an eye is secured in the block adjacent the handle so that the pin may be secured in locked position by a padlock through handle and eye. Each block also has another projecting eye and a chain passed through the latter eyes and around the wheel can be locked by the padlock to prevent theft of the vehicle.

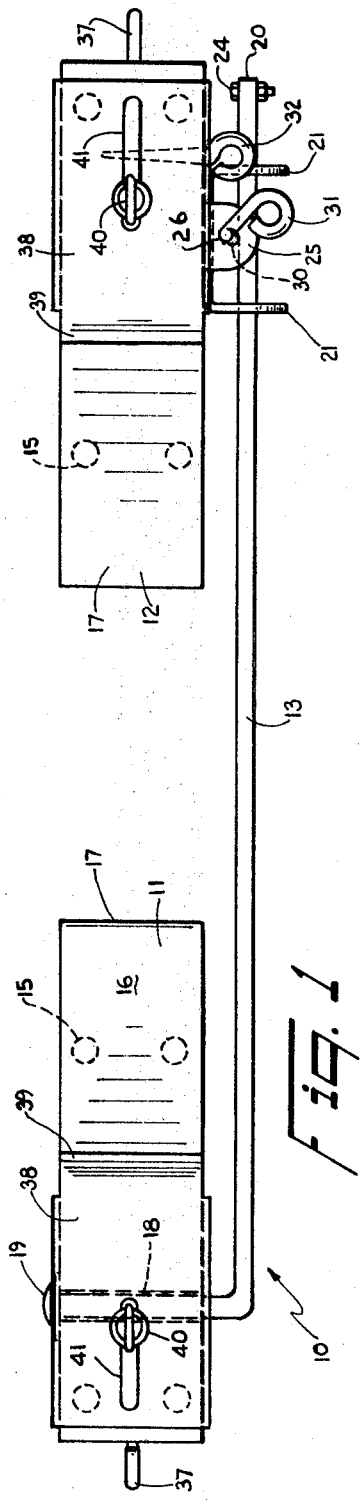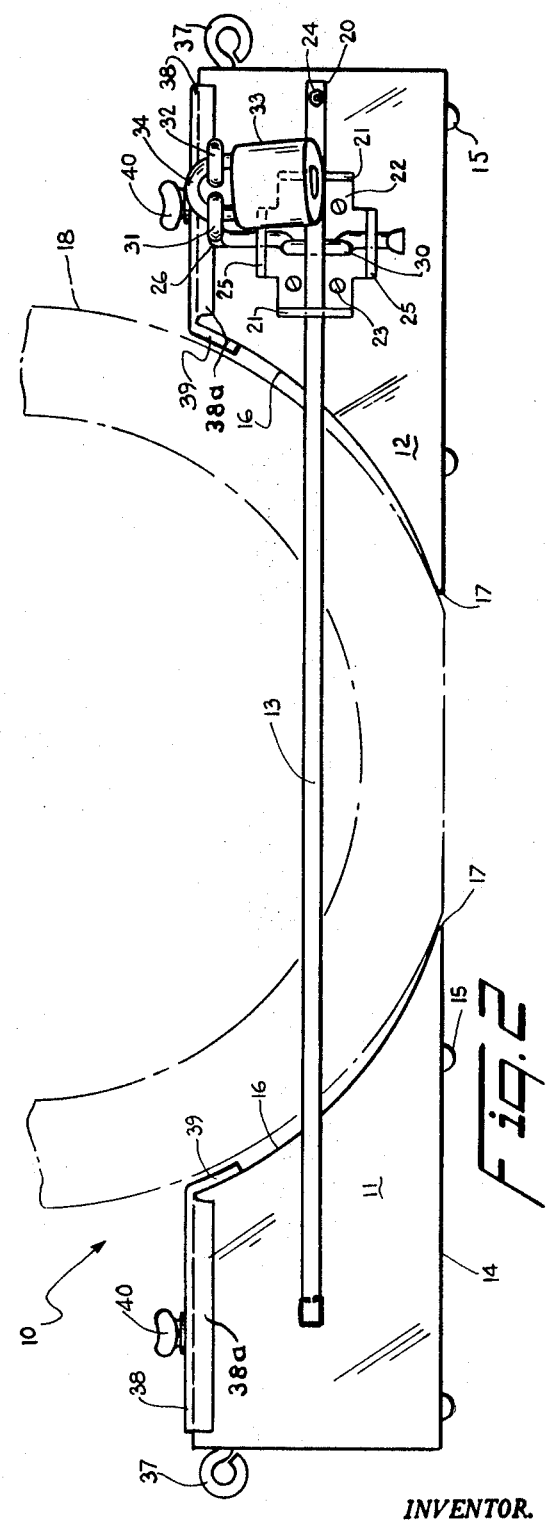

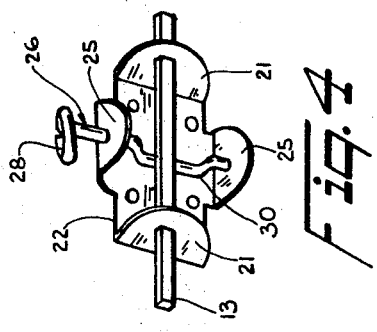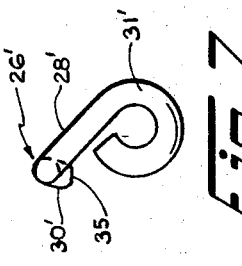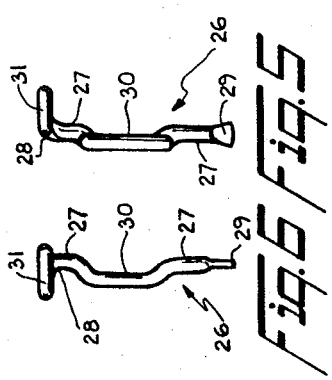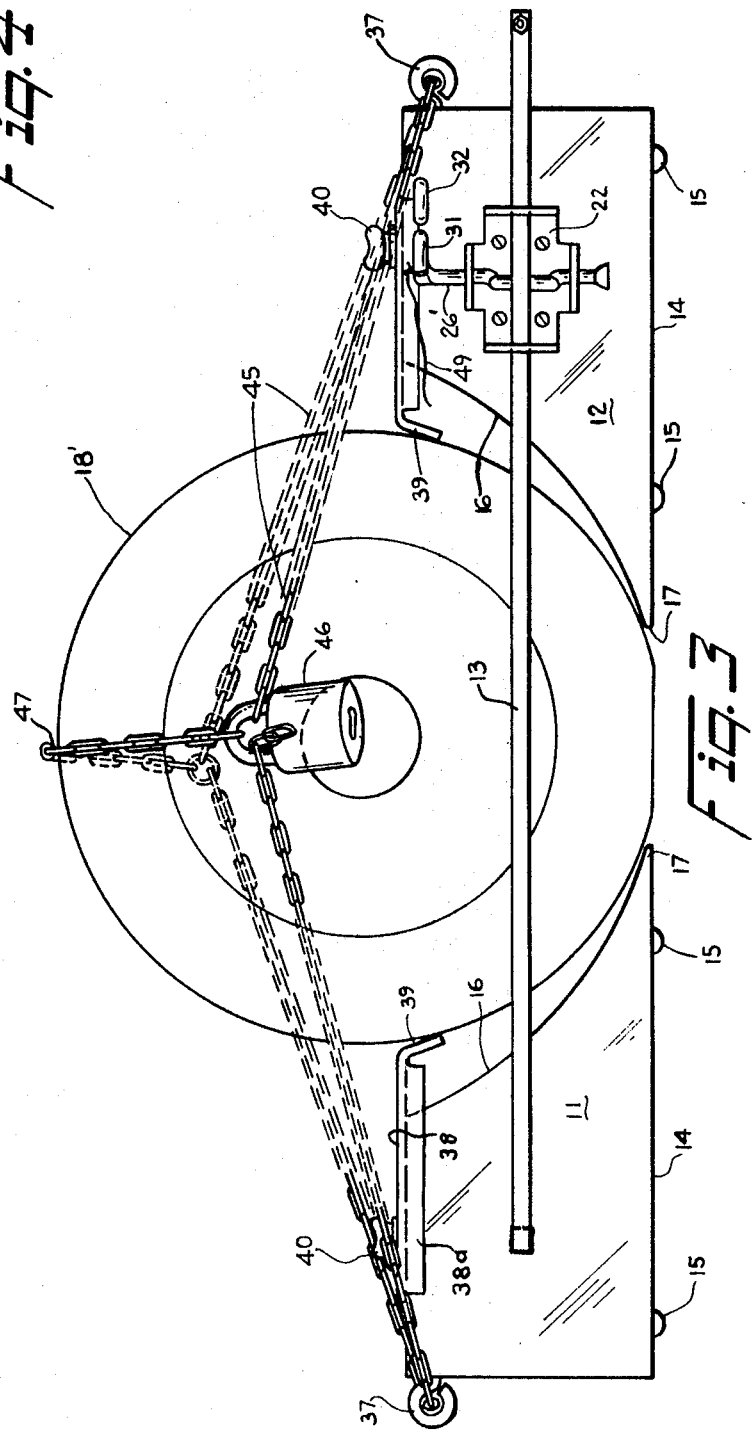

SAFETY LOCKING BLOCK DEVICE FOR WHEELED VEHICLES

BACKGROUND OF THE INVENTION

This invention relates to locking blocks for wheeled vehicles and more particularly to a pair of blocks for front and back of a wheel, the blocks being secured together by means which can be locked to prevent accidental removal or to prevent theft.

Prior art devices include simple chocks which may be accidentally removed or dislodged. Such devices which are adapted to be locked in place include a member or members which pass between the spokes of a wheel in order to lock the device to a wheel. Modern automobile and airplane wheels do not have spokes and the wheels are either solid discs or have passages therethrough too small for the passage therethrough of locking members.

SUMMARY OF THE INVENTION

In so simple an operation as changing a tire, it is necessary to jack the wheel off the ground and when the back wheel is removed, even when the car is in gear, the car may roll down hill upsetting the jack. Setting the emergency brake makes the wheel change difficult. As a safety measure, therefore, a wheel on the opposite side should be chocked and, to prevent careless or accidental dislodgment of the chock, it should be secured to the wheel.

Airplanes, when parked in windy weather, require chocks or blocks to prevent them from being blown away and damaged. When left untended the blocks should be locked to the wheels to prevent theft or unauthorized use.

The present invention contemplates a pair of blocks, adjustably secured together so that they can be stored and transported together and yet will fit wheels of different sizes. Provision is made for locking the blocks in position in front of and in back of a wheel so that the blocks cannot be carelessly or accidentally dislodged. Further provision is made for locking the blocks to the vehicle to prevent theft thereof.

A tie bar is provided with one end secured to one block, the tie bar being slidingly secured to the other block so that it can be adjusted against the wheel and means for locking the latter block to the tie bar is equipped with a padlock to prevent thoughtless or accidental removal. Furthermore, a chain is provided which can be engaged with each block, passed completely around the wheel and secured with a padlock to prevent theft.

BRIEF DESCRIPTION OF THE DRAWINGS

FIG. 1 is a plan view of a device embodying the invention;

FIG. 2 is a side elevational view thereof locked in position against a wheel indicated in broken lines;

FIG. 3 is a view, similar to FIG. 2, with the device positioned against, and adjusted for, a smaller wheel and further provided with a locking chain to prevent theft;

FIG. 4 is a fragmentary perspective view of the locking means shown in FIGS. 1, 2 and 3;

FIGS. 5 and 6 are side elevational views of the locking pin shown in FIG. 4 in locked and unlocked positions, respectively; and FIG. 7 is an enlarged top plan view of a modified form of locking pin.

DESCRIPTION OF THE PREFERRED EMBODIMENT

Referring to FIGS. 1 and 2, the locking block device 10 comprises a block or chock 11 and a block 12, secured together by a tie bar or locking bar 13.

Each block has a flat bottom surface 14 provided with studs or projecting screw heads 15, to prevent slipping on snowy or icy surfaces, and a curved surface 16 conforming approximately to the curved tread surface of the largest wheel for which the blocks are intended for use.

Blocks 11 and 12 have a width of approximately the tread width of the wheel and may be of wood, as shown, or of plastic or may be hollow and of metal. Bottom surface 14 and curved surface 16 intersect at a small acute angle at 17 so that the blocks may be wedged or driven firmly under the wheel indicated at 18.

The tie bar or locking bar 13 is preferably of a square cross-sectional configuration and has one end bent at 90 degrees and passing through a hole 18 of like cross-sectional configuration through block 11. Bar 13 and hole 18, of course, may be of any other like irregular cross-sectional configuration to prevent rotation of the bar in the hole or both hole and bar may be round. The bar is headed at 19 so that the bar is firmly secured to block 11. The other end 20 passes through holes of the same cross-sectional configuration as the bar in vertically extending ears 21 projecting from a locking plate 22 which is secured by screws 23, or otherwise, to the outer surface of block 12. The end 20 of locking bar 13 has a bolt 24 passing therethrough so that the bar cannot be withdrawn from the ears 21 without removing the bolt.

Plate 22 also has a pair of horizontally extending shorter ears 25 projecting therefrom and a locking pin 26 is rotatably secured in holes or journals in the ears 25. Referring to FIGS. 5 and 6 the locking pin 26 has aligned portions 27 passing through the journals of ears 25, a handle portion 28 at its upper end, and a flattened portion 29 at its lower end below the lower ear 25 to prevent its withdrawal from the ears.

Intermediate the aligned portions 27, the pin 26 has a cam or offset portion 30 adapted to jam against the bar 13 when the pin is turned counterclockwise as shown in FIG. 5. The handle portion 28 is bent sharply out of alignment with the aligned portions 27 and terminates in a loop or eye 31, as best seen in FIG. 1, the handle portion 28 and the cam portion 30 being angularly offset, as shown.

A screw eye or eyebolt 32 is secured to the block 12, projecting therefrom adjacent the handle loop 31 when pin 26 is turned counterclockwise with the cam 30 jammed against the bar 13 so that a padlock 33 may have its shackle 34 engaged in the loop 31 and eye 32 to secure pin 26 in locked position. The blocks 11 and 12, being jammed against the tread of the wheel 18, are locked together by the bar 13 to prevent accidental dislodgment. When lock 33 is locked the blocks cannot be carelessly or inadvertently removed.

A modified form of pin 26' is shown in FIG. 7 which may be used when it is not desired to provide the padlock 33. Pin 26' is like pin 26 except that the cam portion 30' is flatted at 35 so that when the pin 26' is turned to locked position it will remain in locked position without connecting loop 31' with the eye 32, until pin 26' is again turned clockwise.

Blocks 11 and 12 each are provided with another eye 37 projecting from the outer end thereof, as shown.

The top surface of each block is also provided with a sliding plate 38 which has a turned down end 39 adapted to be engaged against the tread of the tire of wheel 18. Each plate 38 has turned down side flanges 38a to align the plate for longitudinal movement on the block and is adjustably secured to the block by a wing bolt 40 threaded into the block and projecting through a slot 41 in the plate so that the plate may slide toward the wheel when the bolt is loosened and be secured in adjusted position when the bolt is tightened.

In operation, the blocks are always available as a pair since the bar 13 is firmly secured to block 11 and slidably secured to block 12. The blocks are first wedged securely under the front and rear portions of the wheel 18 and then pin 26 is turned, as described above and locked to the eye 32 by padlock 33. This ensures that the blocks will not be carelessly removed.

Referring to FIG. 3, which shows the blocks in position with a smaller wheel 18' such as the wheel of a light airplane, the plates 38 are shown adjusted inward toward the wheel with their bent ends 39 engaged against the tread of the wheel.

To prevent unauthorized moving of the plane a chain 45 is provided passing through the chain-receiving eyes 37 and passing completely around wheel 18', the end links of the chain being secured together by a padlock 46, which may be the same as padlock 33. The run of the chain which is along the inner side of wheel 18 is preferably passed over the axle on which the wheel is supported and a cross chain 47 is provided to hold chain 45 taut.

The inner end of cross chain 47 is secured to the inner run of chain 45 at its center, the other end of cross chain 47 has a link through which the shackle of lock 46 passes to lock chain 47 to the ends of chain 45 where they are locked together near the hub of wheel 18'. Cross chain 47 passes over the top of wheel 18' to support chain 45 to hold it taut and, of course, is useful in passing chain 45 around the wheel.

It will be understood that usually both wheels of light planes should be blocked. For this reason another pair of blocks or a device 10 is also provided for the left side of the plane with the bar 13 on the opposite side from that shown in FIG. 3, the device shown in that FIG. having the block 12 under the forward side of the wheel and having its locking means provided with the modified pin 26'.

When chain 45 has been removed the pin 26' may be turned clockwise to unlock the bar without going under the wing and near the propeller. A long line, indicated at 49, is tied to the loop 31 of pin 26' before the motor is started and the line may be pulled from rearward of the plane to unlock pin 26' and to remove blocks 11 and 12 from under the wheel.

As will be apparent to those familiar with the art, the invention may be embodied in other specific forms without departing from the spirit or essential characteristics thereof.

I claim:

1. A locking block device for wheeled vehicles comprising a pair of blocks, each having a flat ground contacting surface, inner and outer side surfaces and a curved surface adapted to contact the perimeter of a wheel, the ground surface and the curved surface intersecting at a small angle so that the blocks can be driven partially under the front and back lower portions of the wheel tread; an elongated locking bar connecting the blocks and having one end inturned and secured at the outer side surface of one block; a locking plate secured to the outer surface of the other block, the locking plate having vertically extending ears projecting therefrom at either end, the vertical ears having holes therein through which the bar extends, the locking plate also having horizontally extending ears projecting therefrom at its top and bottom, the horizontal ears having vertically aligned holes therethrough; and a locking pin having aligned portions extending through the horizontal ears, a handle portion at its upper end adapted to be manually grasped for turning the pin, and an offset cam portion adapted to contact the locking bar and to become jammed against the bar to lock the bar in the vertical ears when the pin is turned for locking the blocks in position against the wheel.

2. The locking block device defined in claim 1 wherein the locking pin handle portion comprises an eye offset from the aligned pin portions and angularly offset from the cam portion, the locking plate and pin being so arranged that, when the blocks are in place against a plane wheel, a line may be attached to the handle portion and pulled from the rear of the plane to unlock the bar.

3. The locking block device defined in claim 1 wherein the locking pin handle portion comprises an eye offset from the aligned pin portions and said other block having a fixed eye projecting from its outer surface spaced a predetermined distance from the pin handle eye when the pin is in locked position, and including a padlock having a shackle portion adapted to be passed through the adjacent eyes for locking the pin in locked position.

4. The locking block device defined in claim 1 wherein each block has a chain-receiving eye projecting therefrom, a padlock, and a locking chain having links at either end through which the shackle portion of the padlock is adapted to pass, the chain being of such length as to be passed through the eyes and completely around the vehicle above the wheel axle on the inside and having links at its ends adapted to be secured together by the padlock for locking the chain about the wheel, the locking chain having a cross chain having one end secured to the locking chain above the axle and adapted to pass therefrom over the top of the wheel to the locking chain on the outside of the wheel, the other end of the cross chain having a link through which the shackle of the padlock is also adapted to pass, whereby the device is theftproof.

PO-1050
(5/69)

UNITED STATES PATENT OFFICE
CERTIFICATE OF CORRECTION

Patent No. 3,581,846            Dated June 1, 1971

Inventor(s) Julian A. Janus

It is certified that error appears in the above-identified patent and that said Letters Patent are hereby corrected as shown below:

Page 1, in the heading, for "Appl. No. 851,533" read -- Appl. No. 851,553 --; Column 3, line 6, for "secured" read -- permanently secured --.

Signed and sealed this 5th day of October 1971.

(SEAL)
Attest:

EDWARD M. FLETCHER, JR.           ROBERT GOTTSCHALK
Attesting Officer                Acting Commissioner of Patents